United States Patent [19]

Sayo

[11] 3,995,244
[45] Nov. 30, 1976

[54] EXCITING DEVICE FOR USE IN ELECTROMAGNETIC CLUTCH AND A METHOD FOR MANUFACTURING SAME

[75] Inventor: Kosaku Sayo, Katsuta, Japan

[73] Assignee: Hitachi, Ltd., Japan

[22] Filed: Dec. 16, 1974

[21] Appl. No.: 533,079

[30] Foreign Application Priority Data
Dec. 14, 1973 Japan.............................. 48-138595
July 26, 1974 Japan.............................. 49-85173

[52] U.S. Cl.............................. 335/296; 192/84 C; 29/606
[51] Int. Cl.²............................................ H01F 3/00
[58] Field of Search ........... 335/281, 296, 299, 297; 192/84 A, 84 B, 84 C; 29/605, 606

[56] References Cited
UNITED STATES PATENTS

| | | | |
|---|---|---|---|
| 3,244,944 | 4/1966 | Birge................................... | 335/299 |
| 3,494,453 | 2/1970 | Sepko................................. | 335/282 X |
| 3,833,871 | 9/1974 | Fisher et al.......................... | 335/282 |
| 3,854,562 | 12/1974 | Wilczewski......................... | 192/84 C |

*Primary Examiner*—George Harris
*Attorney, Agent, or Firm*—Craig & Antonelli

[57] ABSTRACT

An exciting device for use in an electromagnetic clutch and a method for manufacturing same, in which a member having a cylindrical portion is secured to the end surface of a yoke of a doughnut or annular form to thereby provide a coil supporting portion which is open in the radial direction and has a U-shaped cross section, and then a cnductor is directly wound through the medium of an insulating material around the aforesaid cylindrical portion, after which the exposing portions of the coil formed of the conductor are insulated according to a resin-impregnating treatment or varnish immersion treatment, thereby providing an exciting device for an electromagnetic clutch.

10 Claims, 15 Drawing Figures

(a)

(b)

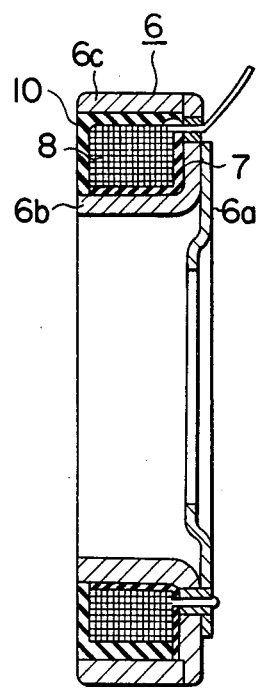
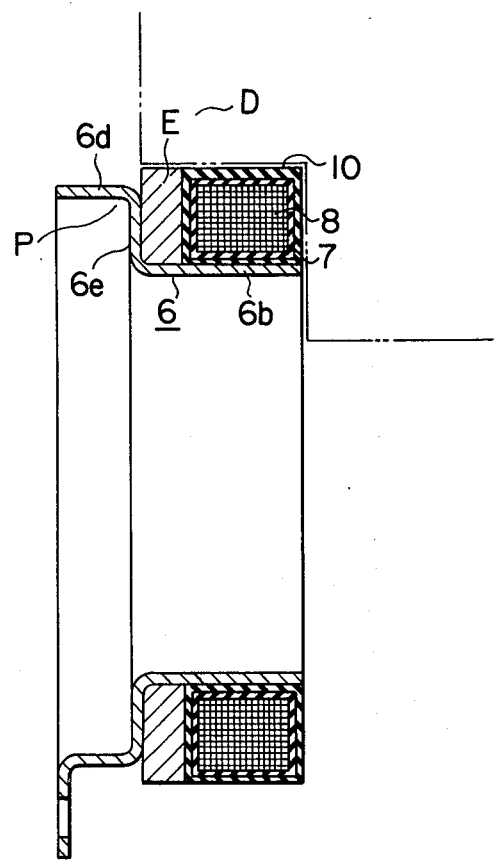
FIG. 3 PRIOR ART
FIG. 4 PRIOR ART

EXCITING DEVICE FOR USE IN ELECTROMAGNETIC CLUTCH AND A METHOD FOR MANUFACTURING SAME

BACKGROUND OF THE INVENTION

1. Field of the Invention

This invention relates to an electromagnetic clutch for use in controlling the operation of a compressor and the like for use in cooling and heating unit in a vehicle, and more particularly to improvements in the exciting device thereof.

2. Description of the Prior Art

For better understanding of the features of the exciting device according to the present invention, description will first be given of a prior art device of this type in conjunction with FIGS. 1 and 2, hereunder.

Referring to FIG. 1, shown at 1 for instance is a shaft of a compressor for use in a cooling and heating unit in a vehicle, and at 1a, for instance, is a fixing member such as a housing of a compressor. Shown at 2 is a hub coupled to the end portion of the shaft 1, and the hub 2 supports a disk-like movable piece 4 of a magnetic material thereon by the medium of a plate spring 3. Shown at 5 is a rotor adapted to rotate in association with the rotation of an engine, and the rotor 5 consists of a disk-like end surface 5a facing the disk-like movable piece 4, a pair of cylindrical portions 5b, 5c having large and small diameters, which portions extent in the axial direction and are integral with the end surface 5a, and a V-shaped groove B defined integrally on the outer peripheral surface of the cylinder portion having a large diameter. In addition, the rotor 5 is rotatably supported by means of a bearing 1b mounted between the fixing member 1a and the small diameter cylindrical portion 5b. Shown at 6 is a stator constituting an exciting device, and the stator 6 consists of a disk-like fixing portion 6a for use in securing same to part of the fixing member 4, large and small diameter cylindrical portions 6b, 6c which are integral with the fixing portion 6a and inserted into an annular space or a hollow defined by the large and small diameter cylindrical portions 5b, 5c, with a small clearance being provided therebetween, and an exciting coil 8 molded into the annular space defined by the cylindrical portions 6b, 6c. Shown at 9 is a terminal of the exciting coil 8, and the feed of an electric current to the terminal 9 provides a magnetic circuit shown by a broken line A, with the aid of the stator 6, rotor 5 and movable piece 4. In this respect, the movable piece 4 is attracted to the end surface 5a of the rotor 5 against a force of a spring 3 and transmits the rotation to a rotary shaft 1 of a compressor and the like through the medium of the hub 2, on which the movable piece 4 is secured.

A known arrangement and manufacturing method of the exciting portion are as follows: (i) a casting is machined so as to provide a stator 6 which has a F-shaped cross-section; a conductor is wound around a coil bobbin 7 to give a coil thereon; the coil bobbin 7 is inserted into an annular space defined by the large and small diameter cylindrical portions 6b, 6c; and finally a resin is impregnated into the aforesaid space according to a molding technique; or (ii) a casting is machined so as to give a member having a small diameter portion 6b which has a L-shaped cross section, as shown in FIG. 3; an insulating portion 7 is provided on the outer peripheral surface of the cylindrical portion 6b; a conductor is directly wound around the cylindrical portion 6b to give an exciting coil 8; a large diameter portion 6c is secured to the end portion of a flange portion integral with the small diameter cylindrical portion 6b; and finally a resin is impregnated around the coil 8 to thereby provide a stator 6.

As shown in FIG. 4, there is known another attempt for providing the exciting portion, in which a steel sheet is formed to give a fixing portion 6 which has a cylindrical portion adapted to be fitted on a fixing body (not shown) and a cylindrical portion 6b supporting a coil thereon; the annular yoke E is fitted on the outer periphery of the cylindrical portion 6b and then welded to part of the fixing portion 6; then the an annular coil 8 wrapped with the insulating material 7 is fitted on the outer periphery of the cylindrical portion 6b; a jig D as shown by the two-point chain line is placed on the annular coil 8; and a resin is poured around the coil 8 to mold the coil 8 around the cylindrical portion 6b.

However, the exciting devices as shown in FIGS. 2(a) and (b) suffer from disadvantages, in that they dictate the use of a great amount of man power for machining the stator 6 and the weight of the device is increased, in addition to inefficient manufacturing operations, since the coil 8 around the bobbin 7 is built in the stator 6.

On the other hand, the exciting device as shown in FIG. 3 permits efficient manufacturing operations, since the coil is directly mounted around the stator member 6 and presents a strong magnetic force due to the increase in turns of a coil to be provided within a given diameter, while the manufacture of the stator member 6 requires complicated machining or the use of a large-size press, and in addition a cylindrical portion encompassing the outer periphery of a coil should be provided, so that there result inefficient manufacturing operations, high cost and increase in the weight of the device. In addition, when a conductor is directly wound around the stator member 6, there is a danger of the coil of coming off the member 6 in the axial direction, because the portion supporting the coil thereon is freed in the axial direction as well.

Still furthermore, with the prior art device shown in FIG. 4, since a relatively thinner steel sheet is used for providing a supporting portion for a coil, so that this provides saving in weight and low manufacturing cost. However, since the coil supporting portion is freed in the axial direction as well, as in the case shown in FIG. 3, direct winding of a conductor on a coil supporting member is confronted by difficulties, and in addition, after being wound around a bobbin, the bobbin carrying the coil has to be fitted in the coil supporting portion. Furthermore, since the device is devoid of a cylindrical portion encompassing the outer periphery of the coil as shown in FIG. 3, the outer surface of the coil is supported merely with a resin, so that the outer periphery of the coil in the radial and axial directions, when molded with resin, should be supported by means of a jig in manufacture. As a result, this increases an additional manufacturing cost of the jig.

Meanwhile, with the conventional exciting devices of this type, it has been a common idea that a yoke portion supporting a coil (large and small diameter portions 6b, 6c in FIGS. 2(a), (b), FIG. 3, end FIG. 4) is an essential factor to provide a magnetic circuit A. However, according to the experiments by the inventors, a majority of magnetic flux in the stator 6 is concentrated on the large wall-thickness portion of the disk-like stator 6, so that large and small diameter cylindrical portions 6b, 6c (or the equivalent thereto) rather cause the leakage of magnetic flux, thus impairing the function of a normal magnetic circuit.

In other words, it is preferable that the stator 6 be composed of a portion providing the magnetic circuit A and a portion supporting the coil, and that the aforesaid two portions be of a shape that a accommodates the respective functions thereof.

In this sense, the device as shown in FIG. 4 provides a yoke portion which provides a magnetic circuit and which is of a thick disk-like shape, while the coil supporting portion has a relatively small thickness, so that this substantially meets the aforesaid requirements. However, as has been described earlier, there are shortcomings in the facts that the conductor is hard to be directly wound around the stator, and the jig for use at the time of molding is costly.

SUMMARY OF THE INVENTION

It is accordingly an object of the present invention to provide an electromagnetic clutch which is light in weight and low in cost.

It is another subject of the present invention to provide a method for manufacturing an electromagnetic device which permits highly efficient operations required for manufacture.

It is a further object of the present invention to provide an electromagnetic clutch which presents an improved performance due to the increase in the special occupying rate of the windings.

According to one aspect of the present invention, there is provided an electromagnetic clutch which comprises: a yoke member forming a magnetic circuit; a supporting member, around which is wound a conductor to give a coil; a stator yoke portion consisting of said yoke member and said supporting member which are secured together, and having a groove which is open in the radial direction and a cross section of a U-shape; a first insulating layer formed on the inner surface of the opening in said stator yoke portion; an exciting coil placed through the medium of said insulating layer; and a second insulating layer formed on the outer periphery of said exciting coil.

According to another aspect of the present invention, there is provided a method for manufacturing an electromagnetic clutch, which comprises: a first step of forming a stator yoke portion having a groove which is open in the radial direction, securing together a yoke portion forming a magnetic circuit and a supporting member supporting the coil; a second step of forming a first insulating layer on the inner surface of the groove in a stator yoke portion which has been formed according to said first step; a third step of directly forming an exciting coil on the inner surface of said groove in said stator yoke portion through the medium of said insulating layer formed according to said second step; and a step of forming a second insulating layer on the outer peripheral surface of said exciting coil formed according to said third step.

According to a further aspect of the present invention, there is provided a method for manufacturing an electromagnetic clutch, which further comprises a fourth step of winding an insulating tape around the outer periphery of the magnetic coil formed according to said third step; a fifth step of forming a varnish layer on said insulating tape formed according to said fourth step, and a sixth step of drying said varnish layer.

These and other objects and features of the present invention will be apparent from a reading of the ensuing part of the specification in conjunction with the accompanying drawings which indicate embodiments of the invention.

BRIEF DESCRIPTION OF THE DRAWINGS

FIGS. 2 to 4 are cross-sectional views illustrating the construction and method for manufacture of the conventional exciting device;

DETAILED DESCRIPTION OF THE PREFERRED EMBODIMENTS

The present invention will be described in more detail in conjunction with the accompanying drawings by referring to one embodiment of the invention.

Figure 1:
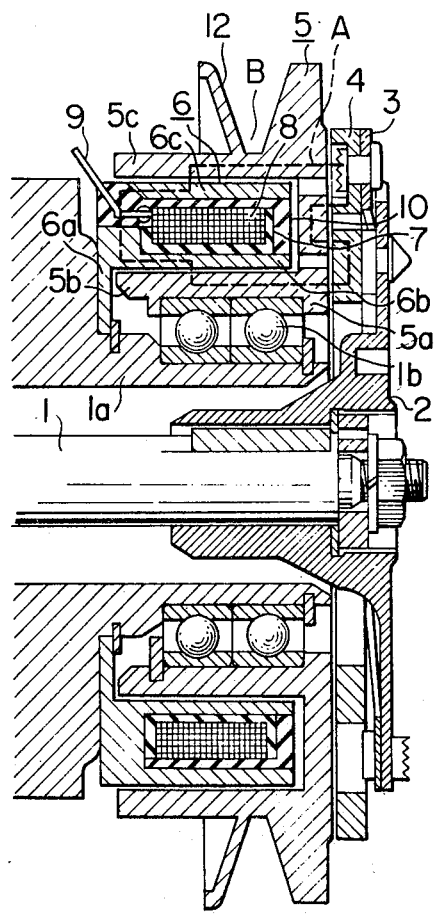
FIG. 1 is a cross-sectional view of an electromagnetic clutch having a conventional exciting device.
Figure 2:
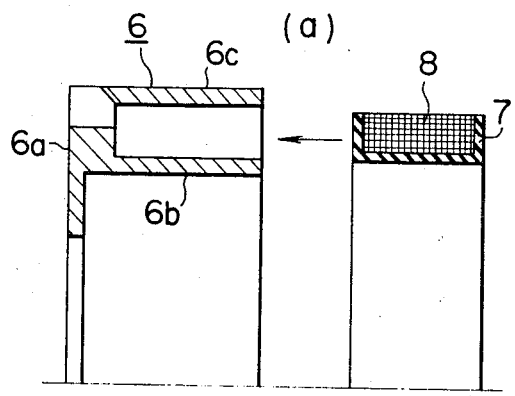
Figure 2:
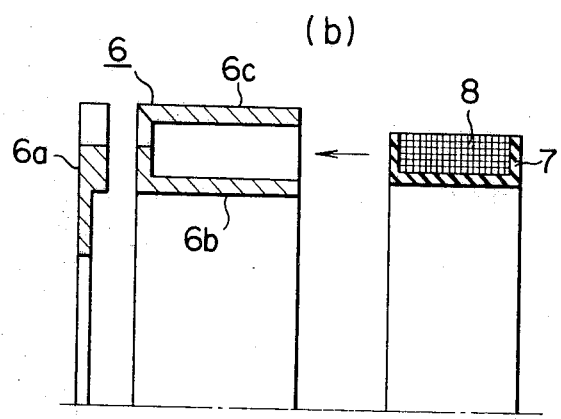
Figure 5:
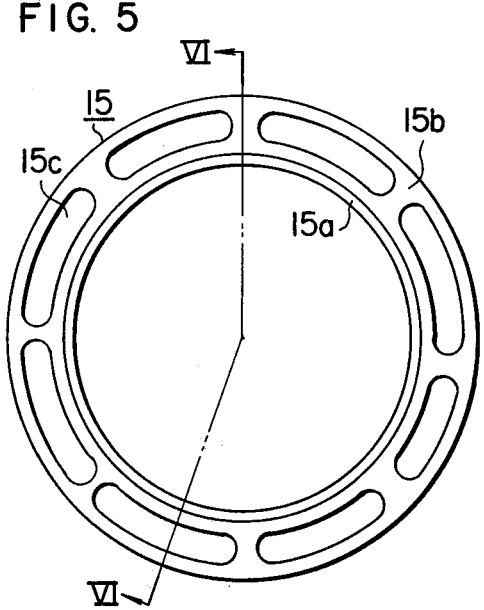
FIGS. 5 to 11 are views illustrating the construction and method for the manufacture of an exciting device according to the present invention.
Figure 6:
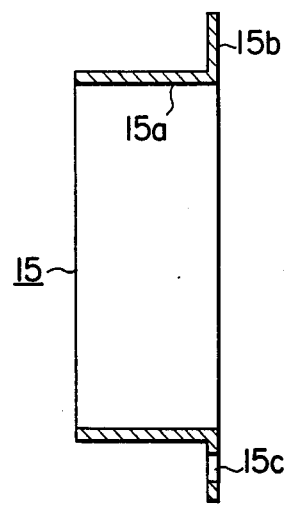

Shown at 15 is a coil supporting member corresponding to the conventional coil bobbin. The coil supporting member 15, as shown in FIG. 6, is provided with a cylindrical portion 15a and a flange portion 15b formed on an end portion thereof, while the flange portion 15b is formed with several elongated holes 15c therein. (FIG. 5)

Figure 7:
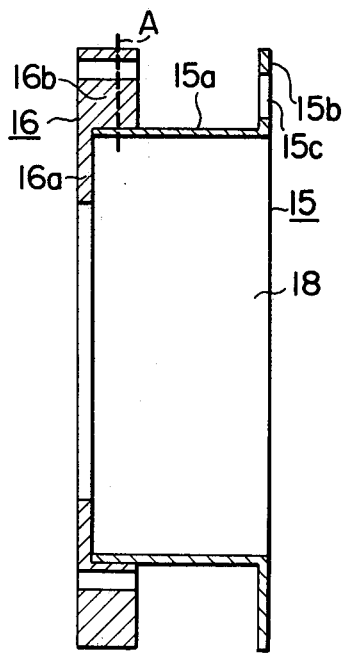
Figure 8:
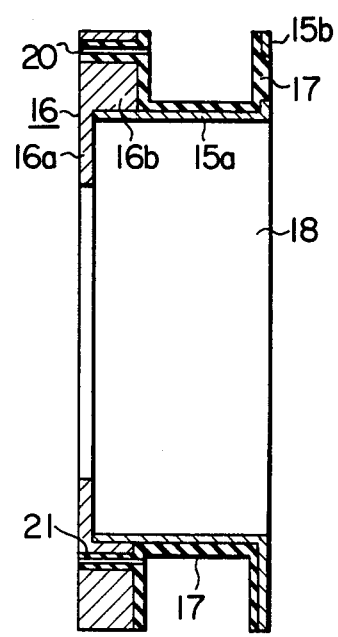
Figure 9:
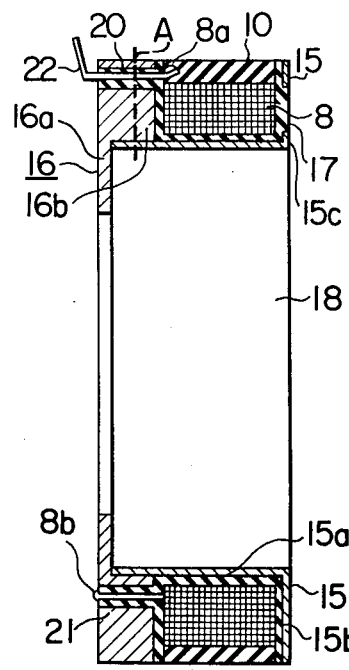

The cylindrical portion of the coil supporting member 15 is secured in the inner diameter of the yoke portion 16 by using welding or soldring, thereby defining a coil supporting portion having a U-shaped cross section defined by the end surface of the yoke portion 16 and the flange portion 15b of the coil supporting member 15, the coil supporting portion extending in the radial direction of the yoke portion 16. (FIG. 7) An insulating layer such as of nylon 17 is formed on the inner surface of the coil supporting member having a U-shaped cross section, and then a conductor is wound around the insulating layer to form a coil. Shown at 22 is a terminal of a plate form, to which is connected the terminating end 8a of the exciting coil 8. The terminal 22 projects through a first small hole 20 provided in a side plate portion 16b, with the insulating member 17 being interposed between the small hole 20 and the terminal 22. (FIG. 9)

Figure 10:
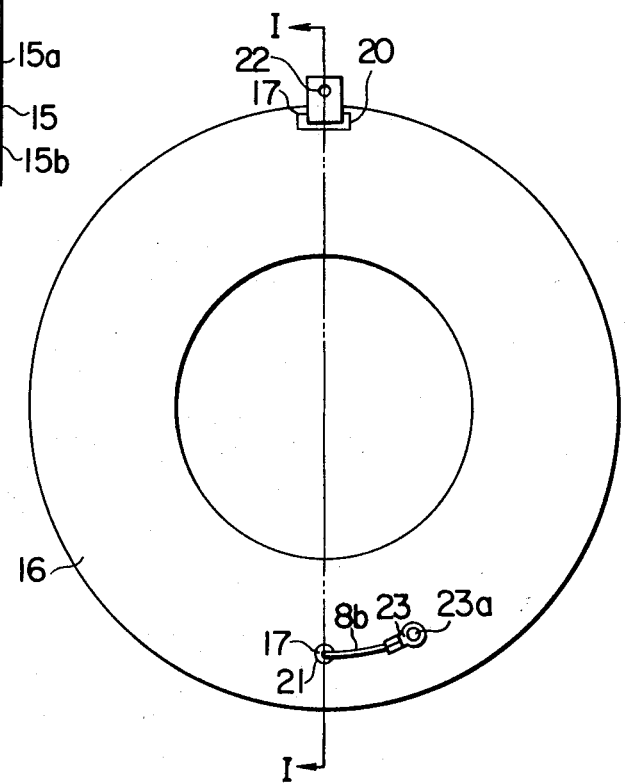

Shown at 23 is a terminal of a ring form, to which the starting end of the exciting coil 8 is calked for connection. The starting end 8b projects through a second hole 21 provided in the main yoke portion 16 having a large thickness, while the insulating layer 17 is interposed between the small hole and the starting end 8b. (FIG. 10)

Shown at 10 is a resinous insulating material which is molded around the outer periphery of the exciting coil 8. (FIGS. 4 and 9)

Shown at 23a is a rivet which is adapted to fasten the terminal 23 of a ring form to the main yoke portion 16b. (FIG. 10)

With the aforesaid arrangement of the exciting device according to the present invention, a magnetic circuit A is formed by the main yoke portion 16b, so that the size of the yoke member is extremely reduced and thus the shape and weight of the device are reduced accordingly, with the reduction in cost.

The operation to support the coil is quite simplified, because a conductor is directly wound around the cylindrical portion of a steel sheet, which cylindrical portion is bounded by the yoke member and extends in the radial direction of the yoke portion. In addition, there is no danger of the coil of coming off the coil supporting portion which is only open in the radial direction thereof, at the time of a winding conductor therearound.

Still furthermore, when a resin is molded on the exposed portion of the coil, a jig suffices to support only the radially open portion of the coil supporting portion, thus reducing the size of a jig.

Yet furthermore, the performance of the device is improved, because a greater number of turns of coil may be provided around a given diameter by directly winding a conductor therearound. In particular, since the opposite sides of the coil supporting member as viewed in the direction at a right angle to the axial direction of the coil supporting member are bounded by the main yoke portion 16b and the flange portion 15b, so that a conductor may be wound up to the top end of the both walls of the coil supporting portion, thus permitting a coil having a great number of turns according to a coil winding manner as shown in FIG. 3.

Furthermore, according to the conventional method, when the coil is molded by impregnating a resin therearound, molding of the lead-out portion of the terminal of a coil is accomplished simultaneously therewith, with a rubber seal mold being placed in abutting relation to the terminal. However, the sealing is often not proper, resulting in leakage of a resin outside, and as a result the resin attaches to the outer surface of the stator yoke, thus spoiling the appearance. In addition, the resin takes a long time for hardening and has to be applied at a high temperature, so that problem exist such as the time for hardening and the deformation of the seal mold made of rubber.

In contrast thereto, according to the present invention, an insulating layer is formed on the inner peripheral surface of a hole, through which the terminal is lead out, simultaneously when the insulating layer is formed on the inner surface of the coil supporting member, and in addition the terminal is inserted in the aforesaid hole to be connected to the coil end portion, so that there is no need to mold the terminal after the completion of the coil winding operation, providing simplicity to operations required for manufacture of the device.

Figure 11:
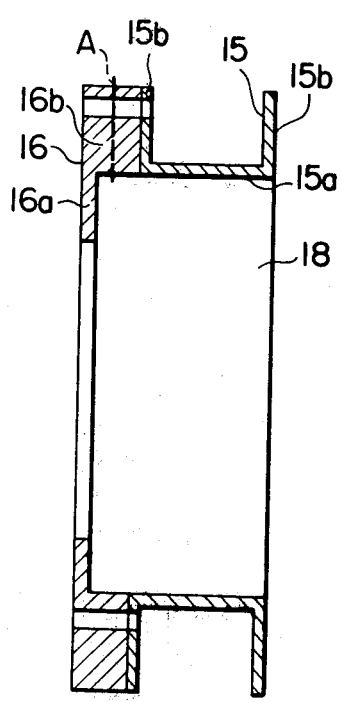
Figure 12:
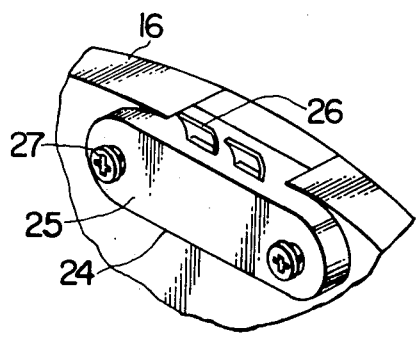
FIG. 12 is a view showing an improved construction of a coil terminal portion of the exciting device according to the present invention.

Meanwhile, the present invention is by no means limitative to the aforesaid embodiments. For instance, as shown in FIG. 11, a coil supporting member, such as made of non-magnetic material (for instance, aluminum) having a U-shaped cross section, may be secured to the end surface of the main yoke member of an arrangement described in the previous embodiment. In this case, it should be noted that this attempt avoids the application of an insulating material to the aforesaid inner surface of a U-shaped cross-section and provides a nonmagnetic supporting portion which is not directed in the direction at a right angle to the magnetic circuit and which is secured in place so as to cover the side surface of the main yoke portion. As a result, there is no need to apply an insulating layer to the inner surface of the coil supporting member, thus saving a manufacturing cost to a great extent.

Figure 13:
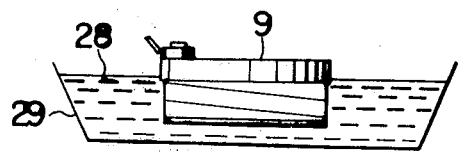
FIGS. 13 and 14 are views illustrating the construction and method for the manufacture of an exciting device according to the present invention as another embodiment thereof.
Figure 14:
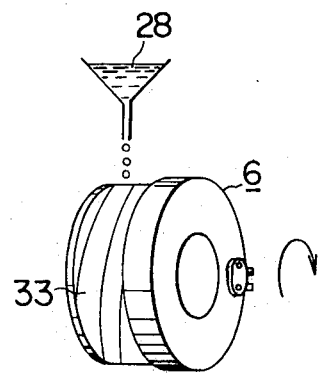
Figure 15:
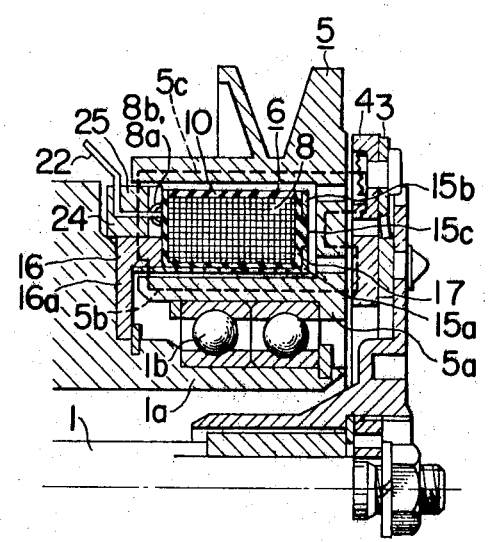
FIG. 15 is a cross-sectional view of an electromagnetic clutch in which is incorporated an exciting device.

In addition, according to another embodiment of the present invention, after the formation of the coil 8, an insulating tape 33 is wound therearound, after which an immersion process or dropwise application of varnish 28 as shown in FIGS. 13 and 14 are applied to the insulating tape thus wound, followed by drying, thus providing an insulating layer or coating.

According to the present invention, there is no need to particularly insulate the terminal of coil 8 with resin and the like, at the completion of forming the coil 8, because the terminal lead-out portion of the coil has been insulated with the insulating coating 17, beforehand. In addition, there is no need to secure the coil to the stator, because the coil is directly wound around the stator tightly. It follows that it may suffice to pay a consideration only to the insulation and protection of the outer periphery of the coil 8, so that a thin insulating layer such as given by varnish may be well adapted for use to this end.

The present invention permits the use of a thin insulating film, so that there may be increased the amount of a conductor to be wound around the stator of a given diameter, with the accompanying improvements in the performance of the exciting device.

The varnish impregnation process may shorten the time until the varnish has been hardened, as compared with the resin impregnation process, and thus this permits the efficient manufacture.

In contrast thereto, according to the prior art using a resin mold-process, the device should be maintained to a given condition in a manner not to cause the resin to flow outside, until the resin has been hardened, so there arises a need to prepare a drying oven of a large size. However, in the case of a varnish impregnation process, the drying time may be shortened, with least possibility of varnish flowing outside. Thus, no limitations are imposed on the drying time. This then permits the three dimensional use of the drying oven, which in turn permits the use of a drying oven of a small size. Still furthermore, this facilitates automated transportation of devices to the drying oven.

Furthermore, the comparison in the amount of resin used with that of varnish has proved that the amount of the varnish required is only about 5 to 10% of that of the resin and thus the use of varnish presents a considerable economy.

As shown in FIGS. 12 to 15, the present invention proposes an attempt, in which the terminal member 24 is molded in a manner that a terminal metal piece 26 is built in a resinous insulating material 25, and then the starting end 8b and terminating end 8a of the exciting coil are connected to the aforesaid terminal metal piece 26, after which the terminal member 24 is secured to the main yoke member 16 constituting the aforesaid stator yoke 6 by means of screws 27.

This provides complete insulation for the terminal and facilitates the leading-out operation of the terminal. In addition, If the starting and terminating ends of the coil 8 are so designed as to be connected to a single terminal member, then there may be eliminated one small hole to be provided in the stator.

Still furthermore, there is no need to insulate the hole which is provided for leading-out the terminal of a stator, thus simplifying formation of an insulating layer.

What is claimed is:

1. An exciting device for use in an electromagnetic clutch, comprising:
    a yoke member forming a magnetic circuit;
    a supporting member, around which is wound a conductor to give a coil therearound;
    a stator formed by securing said yoke member and said supporting member together and having a groove which is open in the radial direction, said stator having a U-shaped cross-section;
    a first insulating layer formed on the inner surface of said groove provided in said stator;
    an exciting coil placed on said supporting member through the medium of said insulating layer; and
    a second insulating layer formed on the outer peripheral surface of said exciting coil.

2. An exciting device for use in electromagnetic clutch, comprising:
    a yoke member forming a magnetic circuit and having a doughnut or annular form;
    a non-magnetic supporting member, around which a conductor is to be wound, said supporting member having a groove which is open in the radial direction thereof and a U-shaped cross section;
    a stator formed by securing said supporting member to the end surface of said yoke member;
    a first insulating layer formed on the inner surface of said groove in said supporting member;
    an exciting coil placed around said coil supporting member through the medium of said insulating layer; and
    a second insulating layer formed on the outer peripheral surface of said exciting coil.

3. A method for manufacturing an exciting device for use in an electromagnetic clutch, comprising the steps of:
    securing a coil supporting member to a yoke member forming a magnetic circuit to thereby provide a stator having a U-shaped cross section to provide a groove which opens in the radial direction thereof;
    winding a conductor directly through the medium of an insulating layer around the inner surface of said groove in said stator to provide an exciting coil thereon; and
    forming an insulating layer on the outer peripheral surface of said exciting coil.

4. A method for manufacturing an exciting device for use in an electromagnetic clutch, as set forth in claim 3, wherein an insulating tape is wound around the outer peripheral surface of an exciting coil, and an insulating film is formed on said outer peripheral surface according to a varnish impregnating process.

5. A method for manufacturing an exciting device for use in an electromagnetic clutch, as set forth in claim 3, wherein said method further comprises the steps of providing a hole for use in taking out the end portion of a coil, in a yoke member forming a magnetic circuit;
    extending said first insulating layer to the inner peripheral surface of said hole;
    inserting said terminal in said hole to thereby connect the starting and terminating ends of said coil to said terminal.

6. A method for manufacturing an exciting device for use in an electromagnetic clutch as set forth in claim 3, wherein said method comprises the steps of:
    providing a hole for use in taking out the end portion of a coil, in a yoke member forming a magnetic circuit;
    securing into said hole a terminal member which has its terminal molded with resin beforehand; and
    connecting the starting and terminating ends of said coil to said terminal.

7. A method for manufacturing an exciting device for use in an electromagnetic clutch as set forth in claim 6, wherein said method comprises the steps of providing two terminals on said terminal member; and connecting the starting and terminating ends of said coil to said terminals, respectively.

8. An exciting device for use in an electromagnetic clutch as claimed in claim 2, wherein said second insulating layer formed on the outer peripheral surface of the exciting coil comprises an insulating tape wound around an outer peripheral portion of the exciting coil, and a coat of an insulating resing applied to an outer surface of said insulating tape.

9. An exciting device for use in an electromagnetic clutch as claimed in claim 2, further comprising at least one hole formed in the yoke member, a film representing an extension of said first insulating layer and covering an inner surface of said at least one hole, and a terminal member inserted in said hole, whereby starting and terminating ends of said exciting coil can be connected to an external power source through said terminal member.

10. An exciting device for use in an electromagnetic clutch as claimed in claim 2, further comprising only one hole formed in the yoke member, and a terminal member made by molding from an insulating resin and inserted in said hole, said terminal member having two terminals so that starting and terminating ends of said exciting coil are each connected to one of said two terminals.

* * * * *